United States Patent
Wu et al.

(10) Patent No.: US 9,025,691 B1
(45) Date of Patent: May 5, 2015

(54) CHANNEL EQUALIZATION

(71) Applicant: Xilinx, Inc., San Jose, CA (US)

(72) Inventors: Michael Wu, Palo Alto, CA (US); Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 14/151,493

(22) Filed: Jan. 9, 2014

(51) Int. Cl.
H04B 7/02 (2006.01)
H04B 1/06 (2006.01)
H04B 7/04 (2006.01)
H04L 27/01 (2006.01)

(52) U.S. Cl.
CPC ............ *H04B 1/06* (2013.01); *H04B 7/0413* (2013.01); *H04L 27/01* (2013.01)

(58) Field of Classification Search
CPC . H04L 5/0026; H04L 5/0037; H04L 27/2607; H04L 25/03159; H04L 25/03605; H04L 25/03414; H04L 27/01; H04B 1/06; H04B 7/0413
USPC ......... 375/232, 262, 267, 299, 324, 340, 341, 375/347
See application file for complete search history.

(56) References Cited

U.S. PATENT DOCUMENTS

| | | | | |
|---|---|---|---|---|
| 7,965,782 | B1 * | 6/2011 | Vijayan et al. ............... | 375/262 |
| 8,737,540 | B1 * | 5/2014 | Shi et al. ...................... | 375/340 |
| 2007/0127589 | A1 * | 6/2007 | Hwang et al. ................ | 375/267 |
| 2008/0037670 | A1 * | 2/2008 | Lee et al. ...................... | 375/260 |
| 2009/0129456 | A1 * | 5/2009 | Miyatani ....................... | 375/232 |
| 2010/0067596 | A1 * | 3/2010 | Park et al. .................... | 375/262 |
| 2010/0067600 | A1 * | 3/2010 | Kim et al. .................... | 375/267 |
| 2012/0033683 | A1 * | 2/2012 | Sahlin et al. ................. | 370/480 |
| 2012/0327757 | A1 * | 12/2012 | Wang et al. .................. | 370/208 |
| 2014/0185594 | A1 * | 7/2014 | Yokomakura et al. ........ | 370/336 |

OTHER PUBLICATIONS

Rao, R. M. et al., "A Low Complexity Square Root MMSE MIMO Decoder," *2010 Conference Record of the Forty Fourth Asilomar Conference on Signals, Systems and Computers*, Nov. 7, 2010, pp. 1463-1467, IEEE, Piscataway, New Jersey, USA.
Wubben, D. et al., "MMSE Extension of V-BLAST based on Sorted QR Decomposition," *Proc. of the 2003 IEEE 58th Vehicular Technology Conference*, Oct. 6, 2003, pp. 508-512, vol. 1, IEEE, Piscataway, New Jersey, USA.

* cited by examiner

*Primary Examiner* — Syed Haider
(74) *Attorney, Agent, or Firm* — W. Eric Webostad

(57) ABSTRACT

A method relates generally to channel equalization. In this method, a filter matrix is determined for transmission antennas by a channel equalizer of a first receiver processing chain. A first QR decomposition is performed on a first extended matrix for a first iteration. LLRs are fed from a second receiver processing chain to the first receiver processing chain for a second iteration. Symbol information is obtained from the LLRs. Interference is canceled using the symbol information to provide residual information. The channel equalizer is updated with the symbol information. The residual information is provided to the channel equalizer. User matrices corresponding to the transmission antennas are determined by the channel equalizer. This determination includes performing a second QR decomposition on a second extended matrix to obtain updated values for the user matrices, and performing updates using the symbol information and the updated values to provide the user matrices.

20 Claims, 5 Drawing Sheets

CHANNEL EQUALIZATION

TECHNICAL FIELD

The following description relates to integrated circuit devices ("ICs"). More particularly, the following description relates to channel equalization for an IC.

BACKGROUND

An iterative receiver for a spatial multiplexing multiple-input, multiple-output ("MIMO") uplink heretofore had QR decompositions corresponding to transmission antennas, namely a QR decomposition per transmission antenna. Though an iterative receiver may provide better bit-error and/or frame-error performance than other types of basestation-based receivers, conventionally such iterative receivers have been considered too costly to implement due to the excessive amount of resources consumed due to their complexity of implementation in terms of semiconductor chip size, as well as power consumption of such resources.

Hence, it is desirable to provide a less complex iterative receiver.

SUMMARY

A method relates generally to channel equalization. In such a method, a filter matrix is determined for a plurality of transmission antennas by a channel equalizer of a first receiver processing chain of an iterative receiver. The iterative receiver includes at least the first receiver processing chain and a second receiver processing chain cross-coupled to one another. This determination of the filter matrix includes performing a first QR decomposition on a first extended matrix for a first iteration through the first receiver processing chain to provide the filter matrix. Log-likelihood ratio ("LLR") information is fed from the second receiver processing chain to the first receiver processing chain for a second iteration through the first receiver processing chain. Symbol information is obtained from the LLR information. Interference is canceled using the symbol information obtained to provide residual information. The channel equalizer is updated with the symbol information. The residual information is provided to the channel equalizer. A plurality of user matrices corresponding to the plurality of transmission antennas are determined by the channel equalizer. This determination of the plurality of user matrices includes performing a second QR decomposition on a second extended matrix to obtain updated values for the plurality of user matrices, and performing updates using the symbol information and the updated values to provide the plurality of user matrices.

An apparatus relates generally to channel equalization. In such an apparatus, an iterative receiver has a first receiver processing chain and a second receiver processing chain cross-coupled to one another. A channel equalizer of the first receiver processing chain has a filter matrix associated with a plurality of transmission antennas. The filter matrix is associated with a first QR decomposition on a first extended matrix. A symbol generator of the first receiver processing chain is coupled to receive log-likelihood ratio ("LLR") information from the second receiver processing chain for iterative operation. An interference canceler of the first receiver processing chain is coupled to the symbol generator to receive symbol information associated with the LLR information and coupled to receive data carrying symbols. The interference canceler is coupled to provide residual information to the channel equalizer. The channel equalizer is coupled to receive the symbol information and configured to determine a plurality of user matrices corresponding to the plurality of transmission antennas by the channel equalizer. To determine the plurality of user matrices, the channel equalizer is configured to: perform a second QR decomposition on a second extended matrix to obtain updated values for the plurality of user matrices; and perform updates using the symbol information and the updated values to provide the plurality of user matrices.

Another method relates generally to channel equalization. In such a method, a single filter matrix is determined for a plurality of users for a non-iterative equalization mode for a QR decomposition block. User filter matrices for each of the plurality of users are generated using in part the single filter matrix for an iterative equalization mode. The generating includes determining distinct minimum mean square error ("MMSE") matrices corresponding to k number of users to provide the user filter matrices corresponding to the plurality of users. Each of the MMSE matrices is determined according to $$W_k = \left( \frac{\lambda_k^{-\frac{1}{2}}}{\lambda_k + (1 - \lambda_k) q_k q_k^*} \right) q_k \cdot (R^{-1})^*$$

where * indicates a complex conjugate, $\lambda_k$ is residual power after cancelation, and $q_k$ is a k-th row of a matrix Q.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
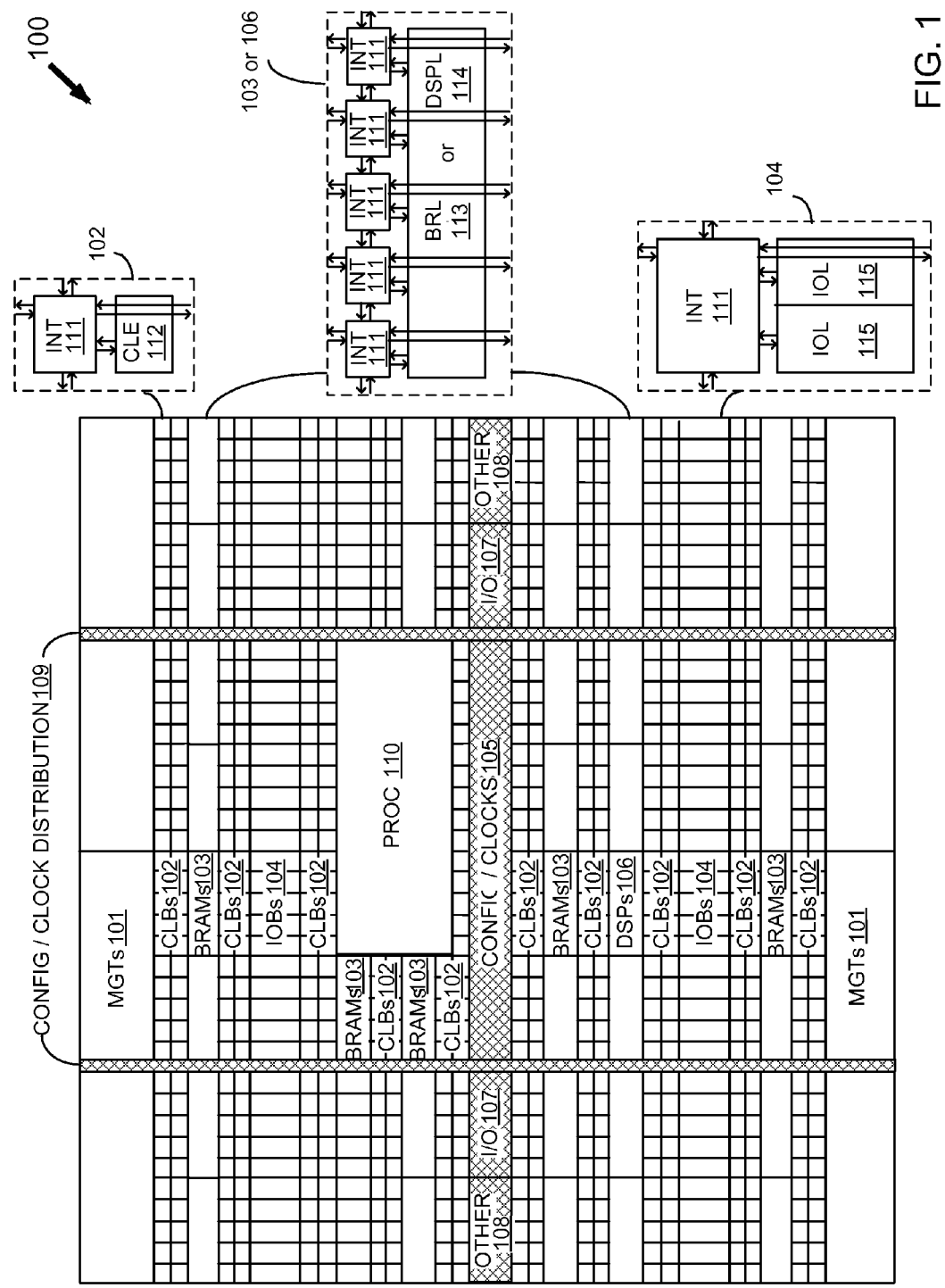
FIG. 1 is a simplified block diagram depicting an exemplary columnar Field Programmable Gate Array ("FPGA") architecture.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

In a conventional MIMO iterative receiver, an iteration loop may be between a channel decoder of one receiver processing chain and a channel encoder of another receiver processing chain. Effectively, output from a channel decoder in one receiver processing chain may be fed back to a channel equalizer positioned in front of another channel decoder in another processing chain after an initial iteration, and with such fed back information or a priori information, such channel equalizer may refine its equalization of symbol data information in a second or subsequent iteration. Output of such channel equalizer may be processed down to a channel decoder in such same receiver processing chain, which allows for iteratively improved decoding performance by such channel decoder, both through channel decoder external and internal loops of which only the former is considered.

This external loop between channel equalizer and channel decoder, such as described above, may be run multiple times, namely multiple iterations. However, each iteration consumes power and time, one or more of which may be in short supply. Part of what drives such consumption is complexity associated with a conventional channel equalization process. A conventional channel equalization process involves performing a complete and separate QR decomposition for each transmission antenna of a channel matrix.

As described below in additional detail, a less complex channel equalization process and less complex channel equalizer is described. Complexity is reduced by performing a full or complete QR decomposition on an initial iteration through a receiver processing chain. As there is no a priori information for such initial iteration, a single initial filter matrix for channel equalization may be generated from such QR decomposition. However, subsequent iterations around a channel equalizer-channel decoder "loop" or "cross-coupling" do not involve a complete QR decomposition per transmission antenna, rather updates, namely an update for each transmission antenna, to another filter matrix from another complete QR decomposition are used. Each update represents a distinct filter matrix per transmission antenna for channel equalization, but each such update involves substantially less complexity than performing a complete respective QR decomposition for each transmission antenna.

With the above general understanding borne in mind, various configurations for an iterative receiver are generally described below.

Because one or more of the above-described examples are described herein using a particular type of IC, a detailed description of such an IC is provided below. However, it should be understood that other types of ICs may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
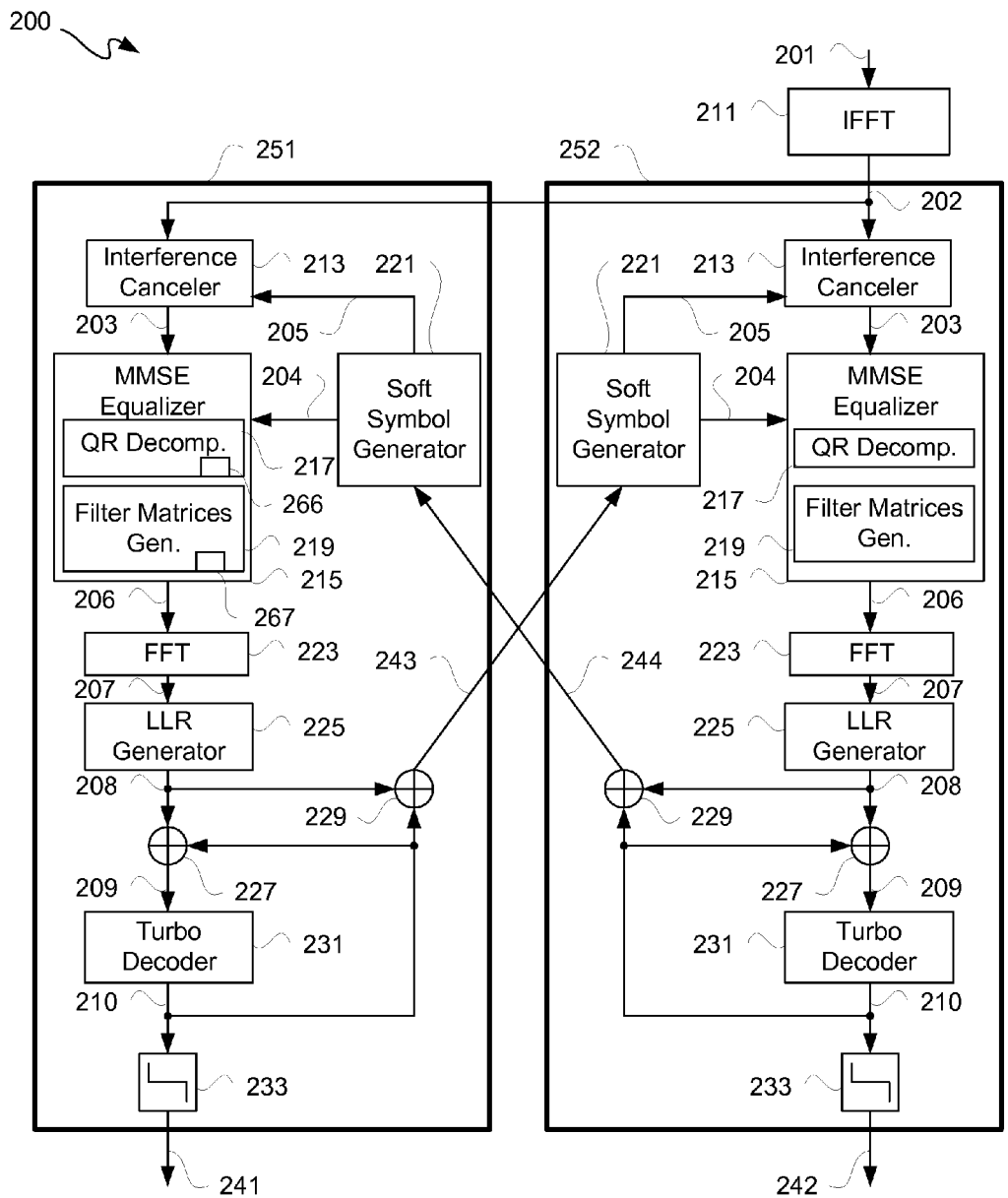
FIG. 2 is a block diagram depicting an exemplary uplink-side of a MIMO receiver.

FIG. 2 is a block diagram depicting an exemplary uplink-side of a MIMO receiver 200. MIMO receiver 200 in this example is a 2×2 LTE spatial multiplexing uplink MIMO receiver; however, the following description is applicable to more than two transmission antennas. MIMO receiver 200 is an iterative receiver which may be found in an LTE basestation. Even though the following description is in terms of LTE, it should be understood that the following description is applicable to other air interface protocols, including GSM and WCDMA, among others.

A received signal y and a channel matrix H for a channel over which received signal y was transmitted to MIMO receiver 200 are provided as input 201 to a frequency-to-time domain conversion block, such as an Inverse Fast Fourier Transform ("IFFT") block 211, of MIMO receiver 200. A time domain signal output 202 from IFFT block 211 is provided as an input to receiver processing chains 251 and 252 of MIMO receiver 200. Even though only two receiver processing chains are illustratively depicted, there may be a corresponding number of receiver processing chains to receiver antennas, and there may be at least as many receiver antennas as there are transmitter antennas transmitting data to such receiver antennas. Outputs of receiver processing chains 251 and 252 respectively are filtered signal 241 for a first in-use transmitter antenna ("user") and filtered signal 242 for a second user.

Additionally, receiver processing chains 251 and 252 are cross-coupled to one another. Receiver processing chain 251 provides a "soft" symbol generator input signal 243 to a "soft" symbol generator 221 of receiver processing chain 252. Likewise, receiver processing chain 252 provides a "soft" symbol generator input signal 244 to a "soft" symbol generator 221 of receiver processing chain 251. Such "soft" symbol generator inputs 243 and 244 may effectively be probabilities or other "soft" values, which may be expressed as logarithmic or log likelihood ratios ("LLRs"), as is well known.

Each of receiver processing chains 251 and 252 includes a respective interference canceler 213, channel equalizer such as MMSE equalizer 215, soft symbol generator 221, time-to-frequency domain conversion block such as a Fast Fourier Transform ("FFT") block 223, LLR generator 225, signal adders or combiners ("combiners") 227 and 229, channel decoder such as Turbo code decoder ("Turbo decoder") 231, and output filter 233. Even though an MMSE equalizer 215 and a Turbo decoder 231 are described herein for purposes of clarity, any channel equalizer and/or any channel decoder may be used. Furthermore, each MMSE equalizer 215 of receiver processing chains 251 and 252 includes a respective QR decomposition block 217 and a filter matrices generator 219. A filter matrix 266 and filter matrices 267 may respectively be generated in QR decomposition block 217 and a filter matrices generator 219. For purposes of clarity and not limitation, only receiver processing chain 251 is described below in additional detail.

Figure 3:
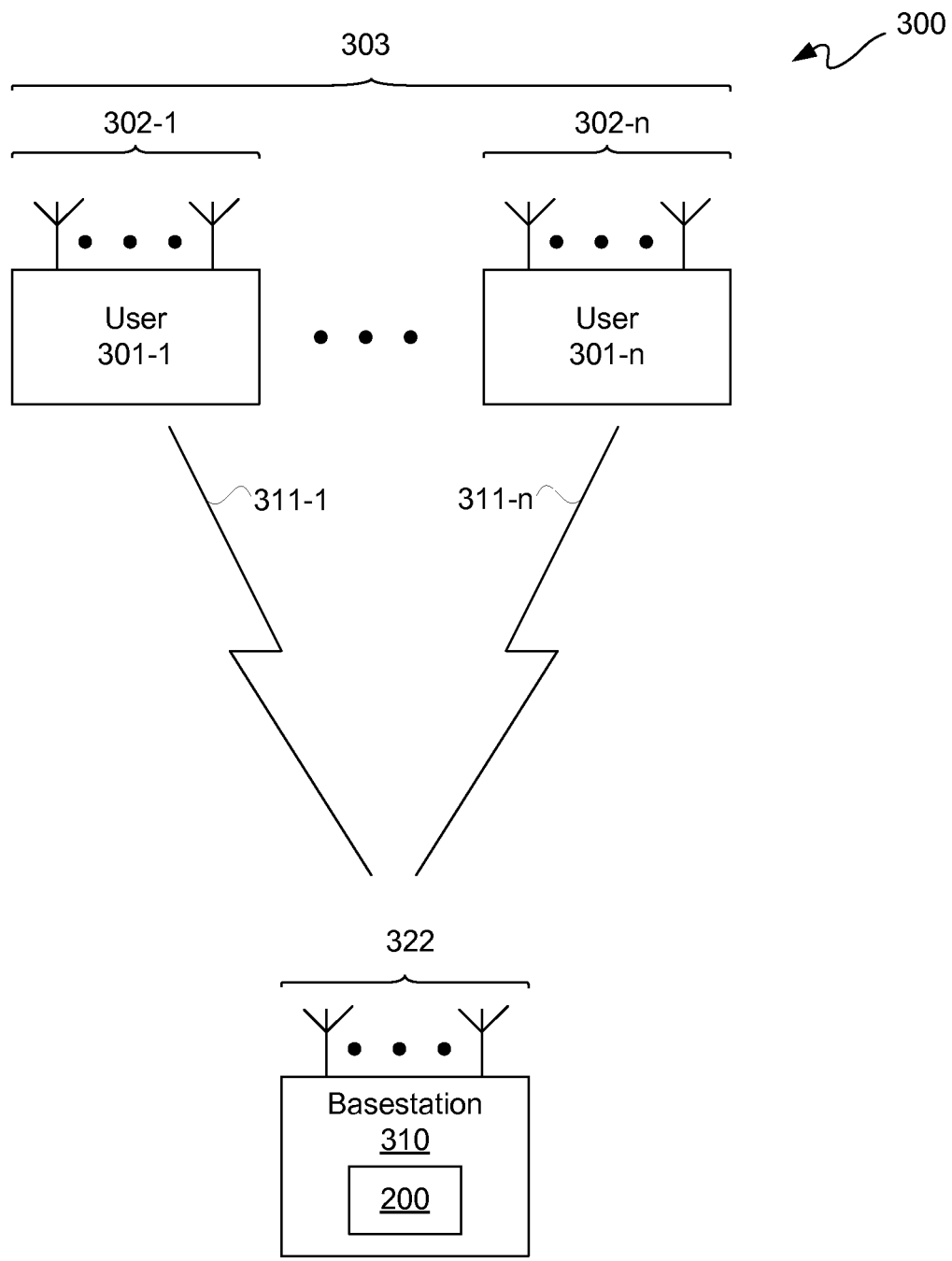
FIG. 3 is a block diagram depicting an exemplary spatial multiplexing MIMO LTE system for an uplink side.

FIG. 3 is a block diagram depicting an exemplary spatial multiplexing MIMO LTE system ("system") 300 for an uplink side. In system 300, there may be a basestation 310 having a plurality of receive antennas 322, and there may be one or more users 301. More often, there may be a plurality of n users, such as users 301-1 through 301-n, for n a positive integer greater than one.

Each of such users 301-1 through 301-n may at some time be in communication with basestation 310 through a corresponding plurality of uplinks 311-1 through 311-n, using LTE, WCDMA, GSM, or other air interface protocol. Each of users 301-1 through 301-n may have a corresponding set of one or more transmission antennas 302-1 through 302-n.

Collectively, for a number of active uplinks 311-n, there may be $n=N_T$ transmission antennas 303 in use at a time, as indicated above such active transmission antennas 303 may sometimes respectively be referred to as "users." Such number of transmission antennas 303 may all be used by a single user 301-1 or by multiple users 301-n.

Users 301-n may be thought of as devices, or more particularly wireless devices such as phones, pads, and notebooks, among other wireless devices. If such $N_T$ transmission antennas 303 are used by a same number of users 301-n, namely where each user has a single transmission antenna 302, then a virtual MIMO array may be formed to send data to a basestation 310 with at least $N_T$ receive antennas 322. In the example of FIG. 2, n is equal to 2 for purposes of clarity and not limitation. In many instances, n may be substantially greater than two. Further, in FIG. 2, each user 301 is assumed to have only a single transmission antenna 302 for a virtual MIMO array. However, in another configuration a single user device may have all the transmission antennas, and this configuration is sometimes referred to as a single-user MIMO array. Furthermore, some configuration in between a virtual MIMO array and a single MIMO array may be used. However, for purposes of clarity and not limitation, a virtual MIMO array shall be assumed.

Each uplink 311-n user 301-n modulates a sequence of bits b into a sequence of data symbols x. For a binary sequence $b=[b0, b1, \ldots, b_{L-1}]$, where $L=\log_2(M)$ for cardinality M. A modulation function map(b) translates such binary vector b onto a data symbol x from a finite alphabet with cardinality M and average power $E_s$ per symbol. For a sequence of data symbols, a time-to-frequency domain converter, such as a Discrete Fourier Transform ("DFT") block, transforms each $N_{DFT}$ length group of data symbols into frequency domain symbols. Frequency domain symbols from such DFT block are mapped to different subcarriers. A sequence of symbols is transformed back to a time domain by a frequency-to-time domain converter, such as an inverse DFT ("IDFT") block. Along those lines, all $N_T$ single antenna uplink users 301 may transmit their time domain symbols over the air using the same time-frequency resource to provide symbol data input 201 of FIG. 2.

Basestation 310 thus receives $N_T$ signals on its receive antennas 322, and each received signal sequence is transformed for input to receiver processing chains of a MIMO receiver 200 of basestation 310. With simultaneous reference to FIGS. 2 and 3, uplink receiver side processing by basestation 310 is further described.

Assuming that a cyclic prefix is longer than length of a channel impulse response, data carrying symbols $s^i$ on an i-th subcarrier, $y_i$, can be expressed as:

$$y^i = H^i s^i + n^i, \quad (1)$$

where a channel coefficient matrix ("channel matrix") H in Equation (1) for each i-th subcarrier may be expressed as:

$$H^i = [h_0^i, h_1^i, \ldots, h_{N_T-1}^i].$$

Each column of such channel matrix H for each i-th subcarrier, $y_i$, of a k-th user 301 represents a channel or uplink 311 between a k-th transmit antenna 302 of such k-th user 301 and a receive antenna of receive antennas 322 upon which such subcarrier, $y_i$, is received. Each element in a column vector $n^i$ in Equation (1) may represent additive white Gaussian noise ("AWGN") for each corresponding i-th subcarrier with a zero-mean and variance as is known.

Basestation 310 attempts to recover bits transmitted by users 301. Along those lines, there may be $N_T$ identical receiver processing chains, such as receiver processing chains 251 and 252 for example. A k-th processing chain attempts to recover bits transmitted by a k-th user.

An "outer" iteration includes one pass through each block of each of receiver processing chains 251 and 252. By exchanging information among receiver processing chains 251 and 252 through "soft" symbol generator input signals 243 and 244 for successive "outer" loop or cross-coupled iterations, MIMO receiver 200 may advantageously obtain better performance with each successive "outer" iteration, and so reducing complexity of MMSE equalizer 215 may facilitate performing one or more of such outer iterations.

With reference to an outer loop iteration of receiver processing chain 251, such an outer loop iteration may include providing log-likelihood ratios ("LLRs") or other a priori information as soft symbol generator input signal 244 as associated with such information, such as symbol data or signal bits, processed by one or more other receiver processing chains other than receiver processing chain 251. Soft symbol generator 221 reconstructs such other information from such a priori LLRs to provide symbol power information for symbols other than those for a k-th user as a reconstructed interference signal 205.

Soft symbol generator input signal 244 may be provided to processing chains other than receiver processing chain 251, as k-parallel receiver processing chains may be included in MIMO receiver 200. Along those lines, a k-th parallel interference canceler, such as interference canceler 213, may consider signals from one or more other users as interference.

Interference canceler 213 may reduce interference for the k-th user by subtracting a reconstructed interference signal 205 output from soft symbol generator 221 from signal output 202 from IFFT block 211. A residual power signal 203 output from interference canceler 213 after cancellation may be provided as input to MMSE equalizer 215. Effectively, interference canceler 213 outputs a residual power associated with a k-th user transmission.

MMSE equalizer 215 may be coupled to receive residual power signal 203 from interference canceler 213. Additionally, MMSE equalizer 215 may be coupled to soft symbol generator 221 to receive signal 204, which is the same information as reconstructed interference signal 205.

MMSE equalizer 215, which may include QR decomposition block 217 and a filter matrices generator 219, may then generate a filter equalized signal 206 for output to an FFT block 223. FFT block 223 may convert such filter equalized signal 206 from a time domain to a frequency domain, and FFT block 223 may output a frequency domain transformed signal 207 for input to LLR generator 225. LLR generator 225 may generate updated a priori LLRs for Turbo decoder 231. Such updated a priori LLRs may be provided as updated LLR signal 208 output from LLR generator 225 and input to signal combiners 227 and 229. Another input to signal combiners 227 and 229 may be extrinsic LLR values of extrinsic LLR signal 210 output from Turbo decoder 231. Output of signal combiner 229 may be soft symbol generator input signal 244, and output of signal combiner 227 may be a soft symbol input signal 209 for updated feedback input to Turbo decoder 231. Turbo decoder 231 in response to soft symbol input signal 209 generates extrinsic LLR values provided via extrinsic LLR signal 210 to signal combiners 227 and 229, as well as output filter 233, which may be a data slicer filter. Such updated a priori LLRs of extrinsic LLR signal 210 may be LLRs for a next iteration about such an outer loop. Output of output filter 233 of receiver processing chain 251 may be output data signal 241 for a k-th user, which in this example is "User 1", and output of output filter 233 of receiver processing chain 252 may be an output data signal 242 for a (k+1)th user for example, which in this example is "User 2".

Generally, most processing effort in a receiver processing chain is in MMSE equalizer 215 and Turbo decoder 231. The following description is for reducing complexity of MMSE equalizer 215 to reduce such processing effort.

Figure 4:
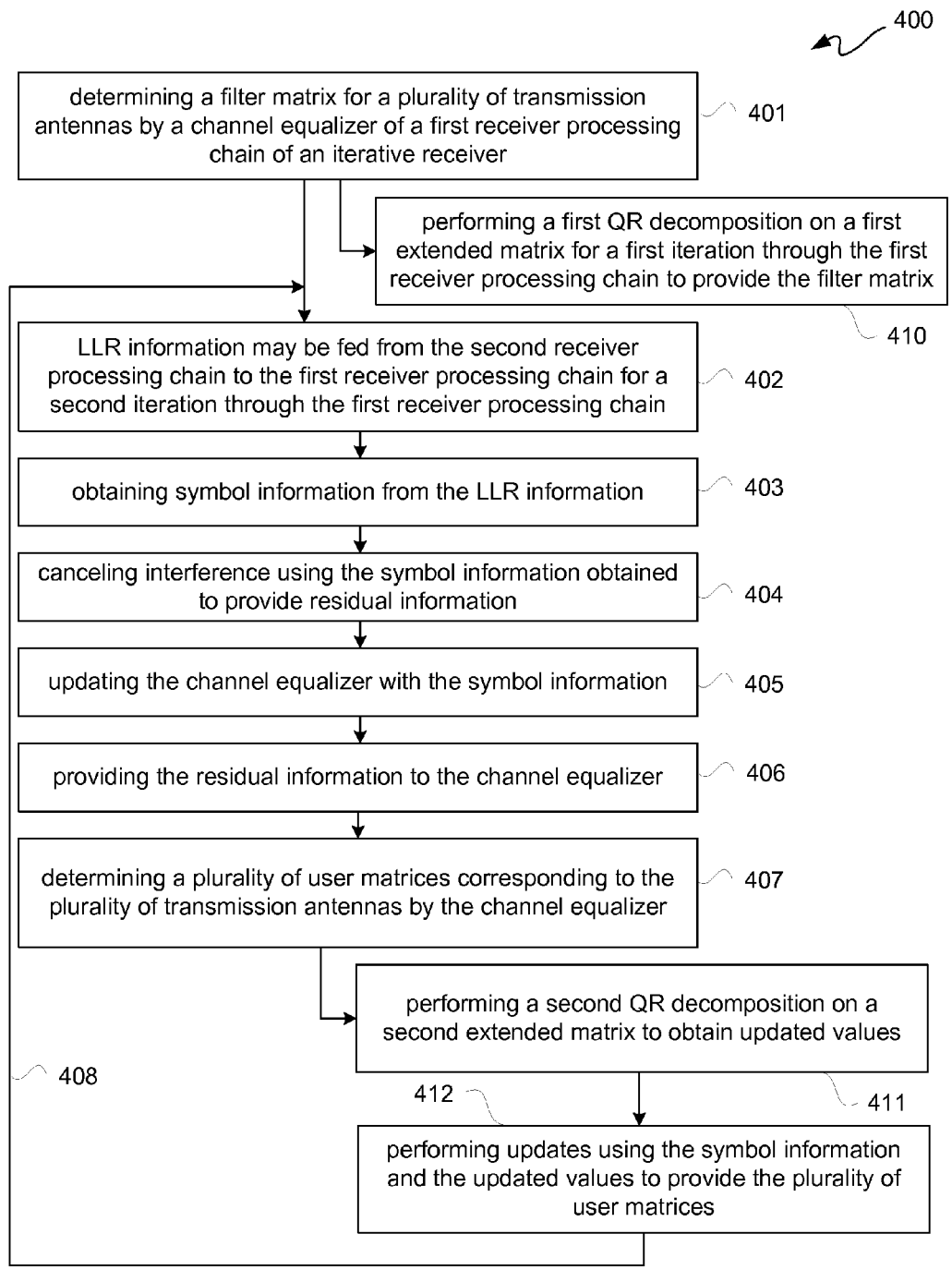
FIG. 4 is a flow diagram depicting an exemplary MMSE equalizer flow for a receiver processing chain of the MIMO receiver of FIG. 2.

FIG. 4 is a flow diagram depicting an exemplary MMSE equalizer flow 400 for a receiver processing chain 251 of MIMO receiver 200 of FIG. 2. MMSE equalizer flow 400 is further described with simultaneous reference to FIGS. 2 through 4.

At 401, a single filter matrix 266 may be determined by MMSE equalizer 215 for a plurality of k users for a non-iterative equalization mode by a QR decomposition by QR decomposition block 217. This operation at 401 may be for an initial or a first iteration through receiver processing chain 251 and may include at 410 performing an extended QR decomposition on an extended channel matrix H to obtain a matrix Q and a matrix $R^{-1}$ by QR decomposition block 217 of MMSE equalizer 215 of receiver processing chain 251. Such a filter matrix 266 may be implemented with programmable resources of FPGA of 100 of FIG. 1. Even though the description hereof is in terms of an FPGA implementation, it should be appreciated that any type of IC may be used in accordance with the description herein. Thus, generally, a filter matrix 266 for a plurality of transmission antennas may be determined by a channel equalizer of a first receiver processing chain of an iterative receiver. Such a filter matrix 266 may be implemented as a systolic array A first or initial iteration of an MMSE equalizer 215 of a receiver processing chain 251 at 401 may correspond to a conventional non-iterative equalization mode as follows. For a first iteration, no a priori information is known. Accordingly, filter output as an estimation of the i-th symbol transmitted by all k users may be mathematically expressed as:

$$\hat{s}^i = W^i y^i = H^{i*}(E_s H^i H^{i*} + \sigma_n^2 I)^{-1} \cdot E_s y^i$$

An extended channel matrix H may be defined as:

$$\underline{H}^* \underline{H} = (E_s H^i H^{i*} + \sigma_n^2 I),$$

where such extended channel matrix, which may be such extended matrix at 410, may be defined as:

$$\underline{H} = \begin{bmatrix} E_s^{1/2} H^{i*} \\ \sigma_n I \end{bmatrix}$$

A QR decomposition at 410 may be performed on such extended channel matrix, where: $\underline{H}$=QR, where Q is a "tall and skinny" matrix $[Q_1\ Q_2]^T$ for T transmission antennas, and where R is a square matrix. Then each i-th symbol or subcarrier output from a single matrix filter W may be mathematically expressed as:

$$W^i = \left[E_s^{\frac{1}{2}} 0\right] \underline{H}(\underline{H}*\underline{H})^{-1} = \left[E_s^{\frac{1}{2}} 0\right] QR(R*Q*QR)^{-1} = E_s^{1/2} Q_1 (R^*)^{-1}.$$

This advantageously may be used to avoid computation of $H^i H^{i*}$, to provide good numerical stability, and to be implemented efficiently as a systolic array.

After a first or initial iteration, a second or other subsequent iterations of MMSE equalizer 215 may be performed as follows.

At 402, LLR information, such as in soft symbol generator input 244 for example from receiver processing chain 252, may be fed back to soft symbol generator 221 of receiver processing chain 251 for a second or other subsequent iteration through receiver processing chain 251. At 403, symbol information may be obtained from reconstructed interference signal 205 output by soft symbol generator 221 from such LLR information fed back. At 404, interference may be canceled by interference canceler 213 using such symbol information obtained at 403 to provide residual information. At 405, a channel equalizer, such as MMSE equalizer 215 of receiver processing chain 251, may be updated with such symbol information, and at 406 such residual information of residual power signal 203 may be provided to such MMSE equalizer 215.

At 407, user filter matrices 267 may be determined or generated for each of such plurality of k users using in part such single filter matrix generated at 401 for an iterative equalization mode. Such user filter matrices 267 may be implemented using programmable resources of FPGA 100 of FIG. 1. Generally, at 407 a plurality of user matrices may be determined corresponding to a plurality of transmission antennas for such filter matrix of 401 by a channel equalizer, such as MMSE 215 of receiver processing chain 251. Such generation at 407 may include determining distinct MMSE matrices corresponding to k number of users to provide such user filter matrices corresponding to such plurality of k users. Along those lines, operation at 407 may include operations at 411 of performing a second QR decomposition on a second extended matrix to obtain updated values for a plurality of user matrices and at 412 of performing updates using symbol information obtained at 405 and such updated values obtained at 411 to provide such plurality of user matrices.

After interference cancellation by interference canceler 213, received signal y 201 by MIMO receiver 200 for a k-th user, in the frequency domain, may be mathematically expressed as:

$$\hat{y}_k^i = y^i - \sum_{j \neq k} h_j^i(\hat{s}_j^i),\ = h_k^i s_k^i + \sum_{j \neq k} h_j^i(s_j^i - \hat{s}_j^i) + n,$$

$$h_k^i s_k^i + \sum_{j \neq k} h_j^i e_j^i + n,\ = h_k^i s_k^i + \hat{n},$$

where $\hat{y}_k^i$ is in effect an i-th symbol or subcarrier ("symbol") received in signal input 201 with attenuated interference, $h_k^i$ is a channel matrix value for an i-th symbol of a k-th user, and $$\hat{s}_j^i \approx \mathbb{E}\ [s_j^i]$$

is a soft estimate of an i-th symbol in a signal transmitted by a j-th user, namely a priori information. After interference cancellation by interference canceler 213, MIMO receiver 200 may resemble a receiver of a Single-Input, Multiple Output ("SIMO") system, where an i-th symbol to be recovered, $s_k^i$ for a k-th user may be corrupted by residual interference and noise, $\hat{n}$.

For example, an adaptive MMSE equalizer 215 at base station 310 may attempt to minimize error between a filtered output 206 and an original symbol, namely a symbol to be recovered, using a priori information obtained from output signal 204 of soft symbol generator 221. Such a priori information may be an estimate of the variance of such residual interference, where the variance of residual interference on the j-th antenna after cancellation is $\lambda j$. Along those lines, MMSE filtered output 206 may be mathematically expressed as:

$$\hat{s}^i = h_k^{i*}(H^i \Lambda_k^i H^{i*} + \sigma_n^2 I)^{-1} \cdot E_s \hat{y}_k^i,$$

where $W_k^i$ is an MMSE filter and $\Lambda_k^i$ is a diagonal matrix, where:

$$\Lambda_k^i = \text{diag}(\lambda_0, \lambda_1, \ldots \lambda_{(N_T-1)}),\ \text{and}$$

$$\lambda_j = \begin{cases} E_s & i = j \\ \mathbb{E}\ [(e_j^i)^2] & k \neq j \end{cases}$$

where $e_j^i$ is residual voltage of an i-th subcarrier and $\mathbb{E}$ is an expectation operator. As described below in additional detail, an MMSE equalizer 215 may be configured to compute or otherwise determine each $W_k^i$ MMSE filter without doing complete QR decompositions for each of a plurality of transmission antennas as in the past. Along those lines, complexity associated with having each user compute or otherwise determine a distinct filter matrix may be reduced or avoided. Also, as described below in additional detail, an extended QR decomposition provided by QR decomposition block 217 built for a non-iterative equalization mode may be reused for iterations subsequent to such an initial iteration.

Generally, there are multiple subcarriers for each user for throughput. However, one subcarrier could be allocated per user. Without any loss of generality, the superscript i is dropped in the following description for purposes of clarity.

At 411, a QR decomposition is computed or otherwise determined on another or second extended matrix by reuse of QR decomposition block 217, which extended matrix, as described below in additional detail, may be of the form:

$$\begin{bmatrix} \Lambda_k^{1/2} H^* \\ \sigma_n I \end{bmatrix}.$$

This performing of a QR decomposition may be done in a single iteration only for all of such k number of users, where k is greater than one. Along those lines, k may be approximately 4 to 8 users for example.

To compute or otherwise determine an MMSE matrix by filter matrices generator 219 for the k-th user, $W_k$, filter matrices generator 219 may be configured to generate a filter matrix according to:

$$W_k = \left( \frac{\lambda_k^{-1/2}}{\lambda_k + (1-\lambda_k) q_i q_i^*} \right) q_k \cdot (R^{-1})^*$$

where $q_k$ is the k-th row of matrix Q and $\lambda_k = \mathbb{E}[(e_k)^2]$, again where $e_k$ is residual voltage and $\mathbb{E}$ is an expectation operator. Thus, filter matrices generator 219 may be configured to obtain information from such QR decomposition at 411 to perform updates at 412 for each transmission antenna of a plurality of transmission antennas, namely each $W_k$ may be determined from updated values from such QR decomposition at 411 as well as symbol information obtained at 405. Another outer loop iteration may be performed as generally indicated by line 408 from operation 412 to operation 402 to further refine outputting of data.

Figure 5:
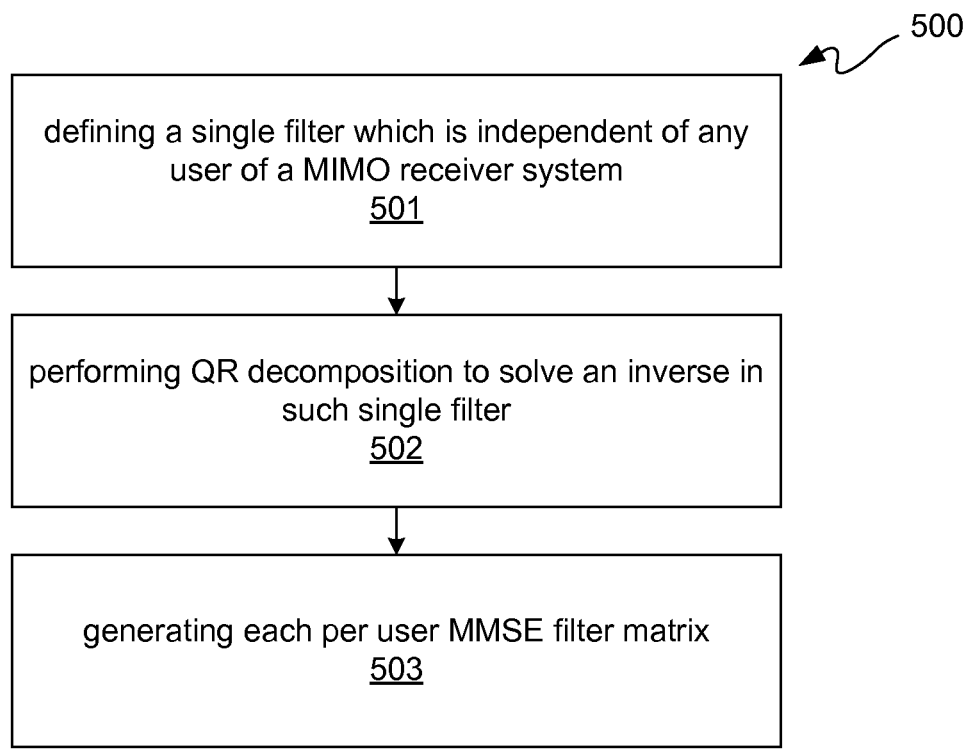
FIG. 5 is a flow diagram depicting an exemplary filter matrices generation flow.

The following description describes construction of $W_k$ as above for use by or as a filter matrices generator 219. FIG. 5 is a flow diagram depicting an exemplary filter matrices generation flow 500.

At 501, a single filter is defined which does not depend on any user. In other words, a single filter is defined which is independent of any user of a MIMO receiver. Given a channel matrix H and a received vector y, an extended matrix $\underline{H}$ and $\underline{y}$ may be constructed so as to perform MMSE equalization:

$$\underline{H} = \begin{bmatrix} \Lambda_k^{1/2} H^* \\ \sigma_n I \end{bmatrix},$$

where:

$$\Lambda = \text{diag}(\lambda_0, \lambda_1, \ldots \lambda_{n-1}), \text{ and}$$

$$\lambda_j = \mathbb{E}[(e_j)^2].$$

Along those lines, configuration of an MMSE equalizer may be written in terms of $\underline{H}$ and $\underline{y}$ as follows:

$$[\Lambda^{-1/2} 0] \cdot \underline{H}(\underline{H}^* \underline{H})^{-1} = \left[\Lambda^{-\frac{1}{2}} 0\right] \cdot \underline{H}(\underline{H}^* \underline{H})^{-1},$$
$$= \left[\Lambda^{-\frac{1}{2}} 0\right] \cdot \underline{H}(H \Lambda H^* + \sigma_n^2 I)^{-1},$$
$$= \left[\Lambda^{-\frac{1}{2}} 0\right] \cdot \begin{bmatrix} \Lambda_k^{\frac{1}{2}} H^* \\ \sigma_n I \end{bmatrix} (H \Lambda H^* + \sigma_n^2 I)^{-1},$$
$$= H(H \Lambda H^* + \sigma_n^2 I)^{-1}.$$

$$= H(H \Lambda H^* + \sigma_n^2 I)^{-1}.$$

At 502, QR decomposition is used to solve for the inverse in such single filter defined at 501. Along those lines, QR decomposition may first be performed on an extended channel matrix as $\underline{H} = QR$, where Q is a tall and skinny matrix $[Q_1 \; Q_2]^T$ and R is a square matrix. From the above equations in reference to the operation at 501, substitution may be used as follows:

$$\left[\Lambda^{-\frac{1}{2}} 0\right] \cdot \underline{H}(\underline{H}^* \underline{H})^{-1} = \left[\Lambda^{-\frac{1}{2}} 0\right] \cdot QR(R^* Q^* QR)^{-1}, \quad (2)$$
$$= \left[\Lambda^{-\frac{1}{2}} 0\right] \begin{bmatrix} Q_1 \\ Q_2 \end{bmatrix} R(R^* R)^{-1},$$
$$= \Lambda^{-\frac{1}{2}} Q_1 (R^*)^{-1}.$$

At 503, each per user MMSE filter matrix may be generated as defined in Equation (2). Along those lines, let $\Gamma_k$ be a diagonal matrix used to scale $\Lambda$ such that $\Gamma_k \underline{H}^* = \Lambda_k H^*$, so a k-th diagonal term of an identity matrix may be replaced with $\mathbb{E}[(e_k)^2]^{-1}$. Operation of a corresponding MMSE equalizer may thus defined as:

$$\Lambda^{-\frac{1}{2}} H(H^* \Gamma_k H^*)^{-1} = \left[\Lambda^{-\frac{1}{2}} 0\right] \underline{H}(H \Gamma_k H^*)^{-1}, \quad (3)$$
$$= \left[\Lambda^{-\frac{1}{2}} 0\right] \underline{H}(H \Gamma_k \Lambda H^* + \sigma_n^2)^{-1},$$
$$= H^* (H \Lambda_k H^* + \sigma_n^2 I)^{-1}.$$

$$= H^*(H \Lambda_k H^* + \sigma_n^2 I)^{-1}. \quad (3)$$

The k-th row of Equation (3) is an MMSE filter matrix for the k-th user $W_k$.

Such per antenna MMSE equalizer may be expanded, along with Equation (3), and results of such expansion may be related to Equation (2) as follows:

$$\Lambda^{-1/2} H(H^* \Gamma_k H)^{-1} = \left[\Lambda^{-\frac{1}{2}} 0\right] \cdot QR(R^* Q^* \Gamma_k QR)^{-1} y$$
$$= \left[\Lambda^{-\frac{1}{2}} 0\right] \begin{bmatrix} Q_1 \\ Q_2 \end{bmatrix} RR^{-1}(Q^* \Gamma_k Q)^{-1}(R^*)^{-1}$$
$$= \Lambda^{-\frac{1}{2}} Q_1 \left([Q_1^* Q_2^*] \Gamma_k \begin{bmatrix} Q_1 \\ Q_2 \end{bmatrix}\right)^{-1} (R^{-1})^*$$
$$= \Lambda^{-1/2} Q_1 (\Delta_k)^{-1} (R^{-1})^* y.$$

By Sherman-Morrison formula, it may be stated that:

$$(\Delta_k)^{-1} = (A + uv^*)^{-1} = A^{-1} - \frac{A^{-1} uv^* A^{-1}}{1 + v^* A^{-1} u},$$

Since $A = Q'Q = I$ for I an identity matrix, it may be stated that:

$$(\Delta_k)^{-1} = (I + uv^*)^{-1} = I - \frac{uv^*}{1 + v^* u},$$

Matrix $\Gamma_k$ is close to the identity matrix. When matrix $\Gamma_k$ is multiplied by Q, matrix $\Gamma_k$ only has an effect on column of $Q_1^*$. Along those lines, u and $v^*$ may be defined respectively as:

$$u = (\lambda_k^{-1} - 1) \cdot q_k^*, \text{ and}$$

$$v^* = q_k$$

where $q_k$ is the k-th row of $Q_1$. Substituting for u and v* in the above equation for $(\Delta_k)^{-1}$ yields:

$$(\Delta_k)^{-1} = I - \frac{(\lambda_k^{-1}-1)q_k^* q_k}{1+(\lambda_k^{-1}-1)q_k q_k^*}.$$

Because a k-th MMSE equalizer of a receiver processing chain may operate with only a k-th row of an MMSE filter matrix. Per antenna MMSE equalizer output may be defined as:

$$W_k = \lambda_k^{-1/2} q_i (\Delta_k)^{-1} (R^{-1})^*.$$

The term $\lambda_k^{-1/2} q_i (\Delta_k)^{-1}$ may be simplified as follows:

$$\lambda_k^{-\frac{1}{2}} q_i(\Delta_k)^{-1} = \lambda_k^{-\frac{1}{2}} q_i \left( I - \frac{(\lambda_k^{-1}-1)q_k^* q_k}{1+(\lambda_k^{-1}-1)q_k q_k^*} \right) = \left( \frac{\lambda_k^{-1/2} q_k}{\lambda_k + (1-\lambda_k) q_k q_k^*} \right).$$

Therefore, an MMSE filter matrix, $W_k$, may be generated with the following equation:

$$W_k = \left( \frac{\lambda_k^{-\frac{1}{2}}}{\lambda_k + (1-\lambda_k) q_k q_k^*} \right) q_k \cdot (R^{-1})^*.$$

To recapitulate, in a non-iterative mode, an extended QR decomposition may be used to find each MMSE filter. This advantageously may be used to avoid explicit computation of HH*, to improve numerical stability, and to implement an MMSE filter as efficiently as a systolic array. In an iterative mode, MMSE equalization may be defined on a per-user basis. As a result, a distinct MMSE filter may be computed or otherwise determined per user without having to perform complete QR decompositions corresponding in number to active transmission antennas used to provide symbol data input 201 of FIG. 2.

For purposes of comparison, conventionally a QR decomposition may be extended $N_T$ times by a brute force approach, namely a complete QR decomposition for each transmission antenna used. For such brute force approach, an extended QR decomposition may be performed on an extended matrix $$\begin{bmatrix} \Lambda_k^{1/2} H^* \\ \sigma_n I \end{bmatrix}$$

on a per-antenna basis to generate each $W_k^i$. Since complexity of QR decomposition is $O(N_T^3)$ for an iterative receiver, complexity of $N_T$ equalizers for an iterative receiver in a basestation may be $O(N_T^4)$. An iterative receiver at a basestation may have at least $N_T$ receive antennas. However, if a basestation has more than $N_T$ antennas for reception, then even more reduction in complexity may be obtained. In contrast, by reusing a QR decomposition block and performing QR decomposition on an extended matrix $$\begin{bmatrix} \Lambda_k H^* \\ \sigma_n I \end{bmatrix}$$

only one time for an iteration, followed by $N_T$ updates, a less complicated implementation may be obtained. Each update costs $O(N_T)$ due to computation or other determination for $q_k q_k^*$. As a result, total complexity for a single QR decomposition followed by updating as described herein is $O(N_T^3) + O(N_T^2)$, which is a significant reduction from such conventional approach. Specifically, this means that advantageously fewer multiplications or multipliers may be used to provide a channel equalizer, whether in an FPGA, an ASIC, or an ASSP.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
   first determining a filter matrix for a plurality of transmission antennas by a channel equalizer of a first receiver processing chain of an iterative receiver;
   wherein the iterative receiver comprises at least the first receiver processing chain and a second receiver processing chain cross-coupled to one another;
   wherein the first determining comprises performing a first QR decomposition on a first extended matrix for a first iteration through the first receiver processing chain to provide the filter matrix;
   feeding log-likelihood ratio ("LLR") information from the second receiver processing chain to the first receiver processing chain for a second iteration through the first receiver processing chain;
   obtaining symbol information from the LLR information;
   canceling interference using the symbol information obtained to provide residual information;
   updating the channel equalizer with the symbol information;
   providing the residual information to the channel equalizer; and
   second determining a plurality of user matrices corresponding to the plurality of transmission antennas by the channel equalizer;
   wherein the second determining comprises:
   performing a second QR decomposition on a second extended matrix to obtain updated values for the plurality of user matrices; and
   performing updates using the symbol information and the updated values to provide the plurality of user matrices.

2. The method according to claim 1, wherein:
   the first extended matrix is of a form:

$$H = \begin{bmatrix} E_s^{1/2} H^* \\ \sigma_n I \end{bmatrix};$$

and
   the second extended matrix is of the form:

$$\begin{bmatrix} \Lambda_k H^* \\ \sigma_n I \end{bmatrix},$$

for H* a complex conjugate of a channel matrix H for an i-th subcarrier of a plurality of subcarriers, I is an identity matrix, $\sigma_n$ is noise power, and $\Lambda_k$ is a diagonal matrix representing residual power after cancelation for each of the plurality of transmission antennas, k.

3. The method according to claim 1, wherein:
the first iteration is for a for a non-iterative equalization mode of the channel equalizer; and
the second iteration is for an iterative equalization mode of the channel equalizer.

4. The method according to claim 1, wherein the plurality of user matrices are a plurality of distinct minimum mean square error ("MMSE") filters corresponding to the plurality of transmission antennas.

5. The method according to claim 1, wherein the performing of the second QR decomposition reuses a QR decomposition block of the channel equalizer populated from the first QR decomposition.

6. The method according to claim 1, wherein the plurality of transmission antennas are associated with sending data to a basestation having the iterative receiver.

7. The method according to claim 1, wherein the plurality of transmission antennas are for a virtual multiple-input, multiple-output ("MIMO") array.

8. The method according to claim 1, wherein the plurality of transmission antennas are for a single-user multiple-input, multiple-output ("MIMO") array.

9. The method according to claim 1, wherein the plurality of user matrices for k number of the plurality of transmission antennas is determined according to $$W_k = \left( \frac{\lambda_k^{-\frac{1}{2}}}{\lambda_k + (1-\lambda_k) q_k q_k^*} \right) q_k \cdot (R^{-1})^*$$

where * indicates a complex conjugate, $\lambda_k$ is residual power after cancelation, and $q_k$ is a k-th row of a matrix Q.

10. The method according to claim 9, wherein the residual power is determined as:

$$\lambda_k = \mathbb{E}[(e_k)^2],$$

where $e_k$ is residual voltage and $\mathbb{E}$ is an expectation operator.

11. An apparatus, comprising:
an iterative receiver having a first receiver processing chain and a second receiver processing chain cross-coupled to one another;
a channel equalizer of the first receiver processing chain having a filter matrix associated with a plurality of transmission antennas;
wherein the filter matrix is associated with a first QR decomposition on a first extended matrix;
a symbol generator of the first receiver processing chain coupled to receive log-likelihood ratio ("LLR") information from the second receiver processing chain for iterative operation;
an interference canceler of the first receiver processing chain coupled to the symbol generator to receive symbol information associated with the LLR information and coupled to receive data carrying symbols;
wherein the interference canceler is coupled to provide residual information to the channel equalizer;
wherein the channel equalizer is coupled to receive the symbol information and configured to determine a plurality of user matrices corresponding to the plurality of transmission antennas by the channel equalizer; and
wherein to determine the plurality of user matrices, the channel equalizer is configured to:
perform a second QR decomposition on a second extended matrix to obtain updated values for the plurality of user matrices; and
perform updates using the symbol information and the updated values to provide the plurality of user matrices.

12. The apparatus according to claim 11, wherein:
the first extended matrix is of a form:

$$\underline{H} = \begin{bmatrix} E_s^{1/2} H^* \\ \sigma_n I \end{bmatrix};$$

and
the second extended matrix is of the form:

$$\begin{bmatrix} \Lambda_k H^* \\ \sigma_n I \end{bmatrix},$$

for H* a complex conjugate of a channel matrix H for an i-th subcarrier of a plurality of subcarriers, I is an identity matrix, $\sigma_n$ is noise power, and $\Lambda_k$ is a diagonal matrix representing residual power after cancelation for each of the plurality of transmission antennas, k.

13. The apparatus according to claim 11, wherein the channel equalizer comprises a reusable QR decomposition block to perform the first QR decomposition and the second QR decomposition.

14. The apparatus according to claim 11, wherein the plurality of user matrices are a plurality of distinct minimum mean square error ("MMSE") filters corresponding to the plurality of transmission antennas.

15. The apparatus according to claim 14, wherein the QR decomposition block comprises a systolic array formed using digital signal processing blocks of a field programmable gate array.

16. The apparatus according to claim 11, wherein the plurality of transmission antennas are associated with sending data to a basestation having the iterative receiver.

17. The apparatus according to claim 11, wherein the plurality of transmission antennas are for a virtual multiple-input, multiple-output ("MIMO") array.

18. The apparatus according to claim 11, wherein the plurality of transmission antennas are for a single-user multiple-input, multiple-output ("MIMO") array.

19. The apparatus according to claim 11, wherein the plurality of user matrices for k number of the plurality of transmission antennas is determined according to $$W_k = \left( \frac{\lambda_k^{-\frac{1}{2}}}{\lambda_k + (1-\lambda_k) q_k q_k^*} \right) q_k \cdot (R^{-1})^*$$

where * indicates a complex conjugate, $\lambda_k$ is residual power after cancelation, and $q_k$ is a k-th row of a matrix Q.

20. A method, comprising:
determining by a channel equalizer of an iterative receiver, a single filter matrix for a plurality of users for a non-iterative equalization mode for a QR decomposition block for a channel equalizer of an iterative receiver;

generating user filter matrices for each of the plurality of users using in part the single filter matrix for an iterative equalization mode of the channel equalizer;

wherein the generating comprises determining distinct minimum mean square error ("MMSE") matrices corresponding to k number of users to provide the user filter matrices corresponding to the plurality of users; and wherein each of the MMSE matrices is determined according to $$W_k = \left(\frac{\lambda_k^{-\frac{1}{2}}}{\lambda_k + (1-\lambda_k)q_k q_k^*}\right) q_k \cdot (R^{-1})^*$$

where * indicates a complex conjugate, $\lambda_k$ is residual power after cancelation, and $q_k$ is a k-th row of a matrix Q.

* * * * *